Dec. 7, 1971  D. REZNIK  3,625,707
SYSTEM FOR HYDRATING DATES
Filed Nov. 22, 1968
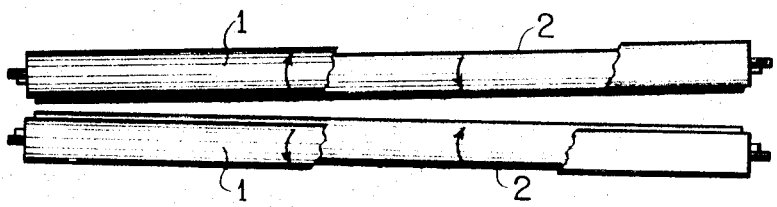
FIG. 1
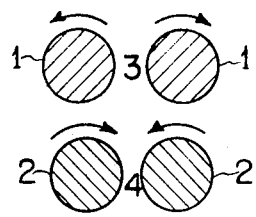
FIG. 2
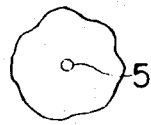  
FIG. 3  FIG. 4
DAVID REZNIK
INVENTOR
BY R. Hoffman
W. Tuschner
ATTORNEYS

United States Patent Office 3,625,707
Patented Dec. 7, 1971

3,625,707
SYSTEM FOR HYDRATING DATES
David Reznik, Berkeley, Calif., assignor to the United States of America as represented by the Secretary of Agriculture
Filed Nov. 22, 1968, Ser. No. 778,165
Int. Cl. A23b 7/00
U.S. Cl. 99—100    3 Claims

ABSTRACT OF THE DISCLOSURE

Apparatus and process are disclosed for hydrating dates in order to render them plump and tender. The system of the invention involves first a fissuring of the skin of the fruit, followed by a vacuum hydration operation by which the moisture content of the fruit is rapidly increased without alteration of its natural flavor.

---

A non-exclusive, irrevocable, royalty-free license in the invention herein described, throughout the world for all purposes of the United States Government, with the power to grant sublicenses for such purposes, is hereby granted to the Government of the United States of America.

DESCRIPTION OF THE INVENTION

This invention relates to and has among its objects the provision of novel apparatus and process for hydrating dates. Further objects of the invention will be evident from the following description taken in conjunction with the annexed drawing. Parts and percentages herein mentioned are by weight unless otherwise specified.

In the drawing, wherein like numerals represent like parts: FIG. 1 is a plan view of the fissuring device in accordance with the invention. FIG. 2 is a schematic cross-section of the fissuring device. FIGS. 3 and 4 depict the stem end of a date before and after fissuring.

It is conventional practice to hydrate dates before packaging them for sale. This is done in order to improve the character of the product. The dried fruit as it reaches the processor has a low moisture content whereby its texture is so tough or hard that it can be eaten only with difficulty and, if it is to be cooked, requires a presoak in water before cooking. On the other hand, the hydrated fruit is soft and tender so that it can be consumed directly. Also, if the product is to be cooked, no soaking is needed. The amount of moisture which is added will vary depending on individual choice, trade practices, etc. In general, the moisture content of the hydrated fruit may vary anywhere from about 25 to 45%.

Various methods have been advocated for accomplishing the desired hydration. The conventional methods involve contacting the fruit with boiling water or steam. The treatment is usually conducted at normal (atmospheric) pressure, but procedures have been advocated wherein the hydration is effected by immersing the dates in water which is maintained at a temperature above 100° C., using superatmospheric pressure to prevent the water from boiling.

Although hydration procedures using hot water or steam are conventionally used in industry they present certain problems. One is that the high temperature of the treatments causes at least a partial cooking of the fruit tissue with the result that flavor changes occur and the product no longer has the natural taste of the raw fruit. Another problem is that application of the high temperatures causes the date tissue to develop an unnatural rubbery texture. A still further problem is that leaching losses occur—water-soluble components are dissolved out of the fruit. These losses are enhanced by the high temperature of the treatment and the long processing time involved. It is common practice to hold the fruit in contact with steam or hot water for periods of 1 to 8 hours or more to attain the desired uptake of water.

A particular object of the invention is the provision of apparatus and process whereby to obviate the problems outlined above.

The hydration method of the invention has the advantage that it is performed at ambient (room) temperatures so that the fruit retains its natural fresh flavor. There is no development of any cooked flavor as necessarily occurs when the hydration is done by contact with steam, hot water, or combinations of steam and hot water. A further advantage of the invention is that the product has a desirable soft texture—it is completely free from the rubberiness which is common in dates which have been hydrated at elevated temperatures. Another advantage of my hydration treatment is its rapidity. The fruit can be fully rehydrated—for example, its moisture content can be brought to a level of 25 to 45%—in a matter of 1 to 5 minutes. This is in sharp contrast with conventional steam or hot water treatments which require hours to properly hydrate the fruit. Moreover, because my novel technique involves a short processing time and low temperature of treatment, leaching losses are eliminated or at least greatly reduced below those entailed in conventional hydration treatments.

One phase of the invention concerns the procedure used to increase the moisture content of the dates. This involves a vacuum treatment conducted, as noted above, at ambient temperature. Another phase of the invention concerns apparatus and process for pretreatment of the dates to enable them to be effectively hydrated. Basically, this involves a fissuring of the skin of the dates. These phases of the invention are described in detail below.

In accordance with the invention, the moisture content of dates is increased by a treatment which involves the following steps: The dates are placed in a vessel, covered with water, and preferably weighted down with a perforated ceramic plate or the like to hold them under the water. The vessel is then sealed and exhausted by means of a conventional vacuum pump. As the pressure is reduced, air normally present in the date tissue is drawn out. After a vacuum has been established in the vessel, the operation of the vacuum pump is discontinued, and the vacuum is broken, i.e., air is allowed to enter into the vessel. As the pressure is so increased, water enters into the dates and occupies the voids in the fruit tissue formerly occupied by air. The moistened dates are then removed from the vessel and are ready for packaging and distribution. It is obvious that the conditions of the vacuum treatment may be varied to secure a desired uptake of water by the dates. For example, other items being equal, the application of a higher degree of vacuum (i.e., lower pressure) will cause a larger increase in the moisture content of the product. In any particular case the degree of vacuum required to achieve a desired moisture uptake can be readily determined by conducting pilot trials on samples of the dates to be treated, using different degrees of vacuum and noting which yields a product of desired moisture level. This degree of vacuum is then employed in treating the batch of dry fruit to be hydrated.

In conducting the vacuum treatment described above, one may add to the water any desired preservative such as sulphur dioxide, sodium benzoate, potassium sorbate, or other conventional water-soluble agent which will protect the fruit from spoiling in storage. In a preferred modification of the invention, one uses an aqueous solution of potassium sorbate, in a concentration of about 0.1%. Thereby, the hydrated dates are prevented from fermentation and spoilage, even if they are stored at high moisture levels, for example, 30% $H_2O$ or above.

As briefly noted above, a second phase of the invention is concerned with apparatus and process for pretreatment of the dates to enable them to be effectively hydrated. I have observed that some lots of dates present an impervious surface, that is, the skin is intact and the stem scar is intact. Dates of this kind cannot be hydrated if retained in their natural condition. Because of their impervious nature, air cannot be effectively drawn out of the interior tissue nor can water be effectively introduced into this tissue. However, my investigations have shown that this situation can be remedied by fissuring the skin of the dates prior to application of the vacuum hydration procedure. By fissuring the skin of the dates, I provide avenues by which air can be readily drawn out of the fruit and by which water can readily enter into the meat or inner tissue of the fruit. The fissuring treatment in accordance with the invention is accomplished by exerting squeezing forces on the fruit, for example, by passing them between rollers. The degree of compression or squeezing is so regulated that it is just enough to crack open the skin; it is not so high as to cause any substantial flattening or other permanent deformation of the fruit.

A preferred form of apparatus for fissuring is shown in FIGS. 1 and 2. This apparatus has the advantage that the distance between the squeeze rolls is correlated with the size of the fruit units so that essentially the same degree of compression is applied to each fruit unit whether it is large or small. Referring to FIG. 1, the device includes a pair of sizing rollers 1 the axes of which diverge from one another by a small angle, and which are rotated by any conventional means (not illustrated) in the directions indicated by the arrows. These rollers are preferably of smooth metal construction, for example, polished stainless steel.

Beneath sizing rollers 1 are a pair of compression rollers 2. These diverge from one another at the same angle as the sizing rollers, but are spaced closer together. Rollers 2 are rotated by any conventional means (not illustrated) in the directions indicated by the arrows. These rollers are preferably of metal, grooved lengthwise to grip the dates passing therebetween.

In operation, the dates to be treated are fed onto sizing rollers 1 at the end where these converge—the left end in FIG. 1. The dates are conveyed by the rollers toward the opposite end, and this movement is generally facilitated by slanting the roller assembly so that the divergent ends are lower than the convergent ends. As the dates move in this manner a size sorting occurs in that the smallest ones drop through the space between rollers 1 in the area near where the rollers converge, the larger ones drop through further toward the divergent end, and so on.

Reference is now made to FIG. 2 which is a schematic cross-section of the fissuring device. As each date drops through the nip 3 between rollers 1 it falls into the corresponding nip 4 between rollers 2. Since these latter rollers rotate in an in-drawing manner they pull the date between them. Moreover, since nip 4 is smaller than the corresponding nip 3 above it, the date is subjected to a squeezing action and its skin is fissured. In setting up the apparatus for a run, the position of rollers 2 relative to rollers 1 is so adjusted that the dates are subjected to a mild squeezing action—sufficient to cause development of fissures in the skin but not sufficient to cause the dates to be substantially flattened or permanently deformed. The required roller settings may be easily determined by pilot trials on a handful of dates and noting which setting provides fissuring without damage to the fruit. Ordinarily, the skin of low-moisture dates is particularly dry and brittle at the stem ends and hence an inspection of these end portions with different roller settings provide a ready index to proper adjustment. Reference in this connection is made to FIGS. 3 and 4 which depict the stem end of a date before and after fissuring. Reference numeral 5 designates the stem scar of the date, and numeral 6 the fissures produced by the roller device. When dates have been so provided with fissures they are in prime condition for the vacuum hydration procedure.

EXAMPLE

The invention is further demonstrated by the following illustrative example.

In these runs, a known weight of fissured dry dates (9% moisture) was placed in a vessel, covered with water and weighted to keep the dates under the water. The vessel was sealed and a specified vacuum was drawn on the system of dates and water. The vacuum was then released, the dates were removed from the water, drained, and re-weighed so that the gain in moisture content could be calculated. This procedure was then repeated applying different levels of vacuum. The processes in each case were carried out at room temperature.

The results are tabulated below.

| | Vacuum applied, in. of Hg | Percent | |
|---|---|---|---|
| | | Increase in weight | Moisture content |
| Run: | | | |
| 1 | 5 | 4 | 12 |
| 2 | 10 | 8 | 15 |
| 3 | 15 | 12.5 | 18.4 |
| 4 | 20 | 17 | 22 |
| 5 | 25 | 21 | 25 |

Having thus described the invention, what is claimed is:

1. A procedure for treating dry dates which have an impervious surface, comprising
    (a) cracking open the skin of the dates by applying squeezing action to said dry dates while concomitantly correlating the force of squeezing with the size of the dates to attain essentially uniform skin cracking of the individual dates without causing the dates to be substantially flattened or permanently deformed, and
    (b) increasing the moisture content of the so-treated dates by applying vacuum and then releasing the vacuum while the dates are immersed in water.

2. The procedure of claim 1 wherein the water contains about 0.1% of potassium sorbate.

3. The procedure of claim 1 wherein step *b* is conducted at ambient temperature.

References Cited

UNITED STATES PATENTS

| 1,704,367 | 3/1929 | Moore | 99—103 |
| 2,689,182 | 9/1954 | Richert | 99—100 |
| 2,745,217 | 5/1956 | Gold et al. | 99—103 |
| 2,865,758 | 12/1958 | Weckel | 99—103 |
| 2,094,083 | 7/1937 | Rey | 99—239 |
| 2,326,407 | 8/1943 | Steinwand | 99—103 |
| 3,467,530 | 9/1969 | Scharschmidt et al. | 99—100 |
| 2,760,872 | 8/1956 | Ferren | 99—100 |

FOREIGN PATENTS

| 352,641 | 9/1937 | Italy | 99—103 |

OTHER REFERENCES

Chemicals Used in Food Processing, National Academy of Sciences, National Research Council, Publication 1274, 1965, p. 5.

NORMAN YUDKOFF, Primary Examiner

C. P. RIBANDO, Assistant Examiner